March 1, 1932. B. KRONENBERGER 1,847,614
APPLIANCE FOR EYE DIAGNOSIS
Filed June 6, 1929
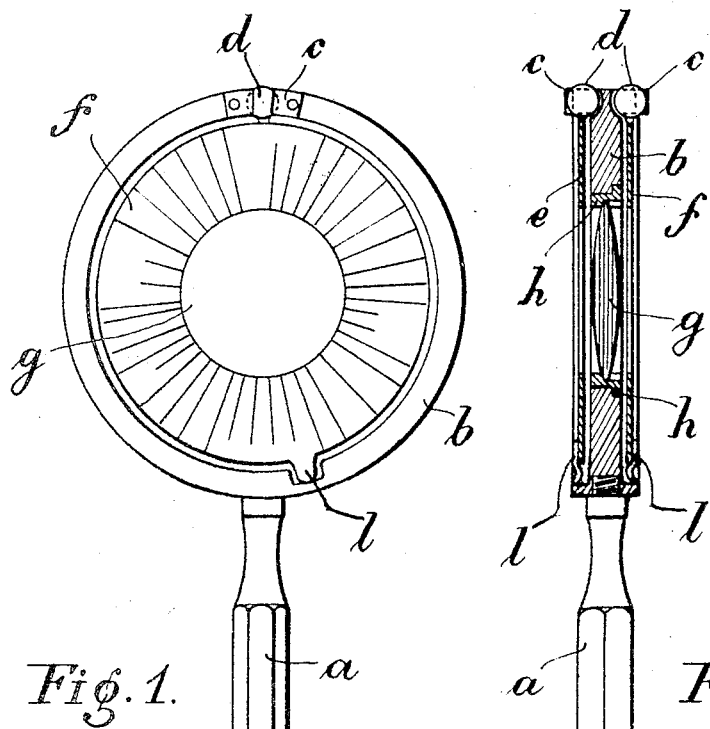
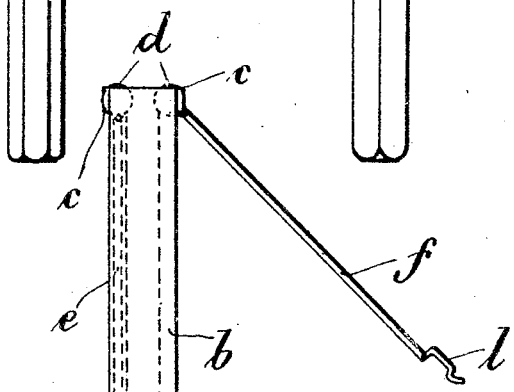
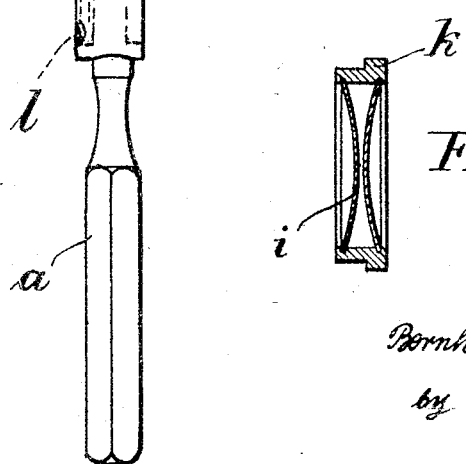
Inventor:
Bernhard Kronenberger
by [signature] Atty.

Patented Mar. 1, 1932

1,847,614

UNITED STATES PATENT OFFICE

BERNHARD KRONENBERGER, OF KAHL-ON-THE-MAIN, GERMANY

APPLIANCE FOR EYE DIAGNOSIS

Application filed June 6, 1929, Serial No. 368,925, and in Germany June 5, 1928.

An application for a patent on this improvement was filed in Germany June 5, 1928.

My invention relates to appliances for eye diagnosis. It is an object of my invention to provide an appliance of the kind described with which a person is able to perform the diagnosis on the eyes of other persons or on their own eyes. To this end I provide a holder and in combination with the holder a magnifying glass, a magnifying mirror which may be alternately inserted in the holder, and a set of scale-bearing members which are adapted to be displaced on the holder so as to cooperate with the magnifying glass and the magnifying mirror as required.

It is an established fact that by eye diagnosis diseases, phenomena of degeneration etc. can be detected in the eyes at a comparatively early stage and so that any person without medical knowledge is able to ascertain the initial stages of a disease, and to apply remedies at an early stage.

Obviously an appliance must be of different construction for diagnosis by another person, and for diagnosis by the person himself. In the first instance, the appliance is equipped with a magnifying glass and in the second instance it is equipped with a pair of concave mirrors. Special scales must be provided for cooperation with the magnifying glass and with the mirror, one scale corresponding to the right and the other to the left eye.

According to my invention the same appliance may be used in both cases so that the cost of an extra appliance is saved and the operation becomes convenient, ready and rapid.

In a preferred embodiment of my invention I attach to the aforesaid holder annular scale-bearing members which are pivotally mounted on the holder so that they may be tilted and reversed.

In the drawings affixed to this specification and forming part thereof an appliance embodying my invention is illustrated diagrammatically by way of example.

In the drawings

Fig. 1 is an elevation of the appliance equipped with the magnifying glass,

Fig. 2 is an axial section through the holder of the appliance,

Fig. 3 is an end elevation of the appliance showing one of its scale bearing members tilted for reversing, Fig. 4 is an axial section of a mirror adapted to be exchanged for the magnifying glass.

Referring now to the drawings, $a$ is a handle, $b$ is a holder secured to the handle, $c$, $c$ are bearings on either side of the holder opposite the handle $a$, $d$ are spherical knuckles in the bearings, $e$ and $f$ are annular scale-bearing members secured to the knuckles, $l$ is a spring clip on each scale-bearing member for holding it in position on the holder $b$, $h$ is a socket adapted to be inserted in the holder $b$ at its centre, and $g$ is a magnifying glass in the socket $h$.

A similar socket $k$ is illustrated in Fig. 4 with a mirror having two concave units $i$ instead of the lens $g$.

The scale-bearing members $e$ and $f$ are made on one side with scales for the right and for the left eye which are used in combination with the magnifying glass $g$ and on the other side with scales which are used in combination with the concave mirror units $i$.

In the position illustrated in Figs. 1 and 2 the outer faces of the scale-bearing members $e$ and $f$ expose the scales for the right and the left eye corresponding to the magnifying glass with which the eyes of other persons are observed. The magnifying glass may be a single or combined magnifying lens.

If it is desired to observe the own eyes, the scale-bearing members are tilted away from the holder $b$ as shown in Fig. 3, the socket $h$ with the magnifying glass $g$ is removed, the socket $k$ with the mirrors $i$ is inserted in its stead, and the scale-bearing members are rotated through an angle of 180° so that the scales which were concealed on the inside for the magnifying glass, are now exposed on the outside for cooperation with the mirror. The clips $l$ hold the scale-bearing member in the new position. The scales which are now exposed show again the right and the left eye but with consideration of the fact that the image is reversed by the mirror as compared with the image of the magnifying glass.

I wish it to be understood that I do not desire to be limited to the exact details of construction shown and described for obvious modifications will occur to a person skilled in the art.

I claim:—

1. An appliance for eye diagnosis comprising a holder, a magnifying lens and a magnifying mirror, a seat in said holder for the alternate reception of said lens and said mirror, and annular scale-bearing members pivotally mounted on, and adapted to be applied to, opposite sides of said holder.

2. An appliance for eye diagnosis comprising a holder, a magnifying lens and a magnifying mirror, a seat in said holder for the alternate reception of said lens and said mirror, annular scale-bearing members pivotally mounted on, and adapted to be applied to, opposite sides of said holder, and scales on both sides of said scale-bearing members.

3. An appliance for eye diagnosis comprising a holder, a magnifying lens and a magnifying mirror, a seat in said holder for the alternate reception of said lens and said mirror, annular scale-bearing members pivotally mounted on, and adapted to be applied to, opposite sides of said holder, and means for clamping said scale-bearing members on opposite sides of said holder.

In testimony whereof I affix my signature.

BERNHARD KRONENBERGER.